United States Patent [19]

Djerf

[11] Patent Number: 4,818,034
[45] Date of Patent: Apr. 4, 1989

[54] SHOCK ABSORBING WHEEL

[75] Inventor: Tobin Djerf, Port Isabel, Tex.

[73] Assignee: Unarco Industries, Inc., Chicago, Ill.

[21] Appl. No.: 137,978

[22] Filed: Dec. 28, 1987

[51] Int. Cl.⁴ ................................................ B60B 5/00
[52] U.S. Cl. ........................... 301/63 PW; 310/63 DT; 310/64 SD; 152/380
[58] Field of Search ................... 152/1, 8, 9, 323, 324, 152/380; 301/63 DD, 63 DT, 64 SH, 64 DS, 63 PW

[56] References Cited

U.S. PATENT DOCUMENTS

| | | | |
|---|---|---|---|
| 2,439,340 | 6/1948 | Hendrickson | 301/63 DD X |
| 2,629,420 | 2/1953 | Walklet | 301/63 DD X |
| 3,843,202 | 10/1974 | Lacerte | 301/63 PW |
| 4,095,846 | 6/1978 | Agins | 301/63 PW X |

FOREIGN PATENT DOCUMENTS 0628786 10/1961 Canada ............. 301/63 PW

Primary Examiner—Robert B. Reeves
Assistant Examiner—John M. Gruber
Attorney, Agent, or Firm—Ronald B. Sefrna

[57] ABSTRACT

The present invention discloses a high strength, shock absorbing wheel generally comprising a two piece hub, preferably of molded construction, a unitary solid wheel molded onto the hub of the wheel, and axle shaft bearings pressed into a central aperture provided in the hub of the wheel. The hub of the wheel comprises two identical halves, divided along a plane of separation perpendicular to the longitudinal axis of the axle upon which the wheel will rotate, with each hub section including a plurality of apertures disposed about its outer rim to form a plurality of passageways through the outer rim of the assembled hub sections, and further including a plurality of concentric grooves disposed about its outer edge and face to form a plurality of keyways therein. During molding of the tire onto the assembled hub of the wheel, tire material flows through each such passageway and into each such groove to form positive interlocks between hub and tire and to provide a system for absorbing and distributing impact shock through the structure of the wheel.

17 Claims, 2 Drawing Sheets

SHOCK ABSORBING WHEEL

FIELD OF THE INVENTION

The present invention generally relates to wheels, and more specifically relates to shock absorbing molded wheels utilizing a solid rubber or plastic tire.

BACKGROUND OF THE INVENTION

The use of wheels utilizing a solid hub with a solid, non-pneumatic tire for applications such as shopping carts, lawn mowers, utility carts, and the like has been common for many years. Such wheels typically comprise a solid hub formed of metal or plastic, and a rubber or plastic tire which is either unitary with the hub, formed as a one piece construction, or formed as a separate part and interconnected to the hub during assembly of the final wheel. In some designs, the hub of the wheel is formed in two halves, which are interconnected prior to attachment of the tire by means of an adhesive, by plastic welding techniques, or by mechanical fasteners, as exemplified by U.S. Pat. No. 2,629,420 to Walklet, U.S. Pat. No. 3,695,728 to Haussels, U.S. Pat. No. 4,153,303 to Tanner, U.S. Pat. No. 4,344,655 to Pellegrino, German Pat. No. 2,651,178, and Canadian Pat. No. 628,786 (two part assembly without tire). There are also previously known wheel designs in which the tire of the wheel is formed around the hub by molding of the tire onto the outer edge of the hub, exemplified by U.S. Pat. No. 3,387,894 to Louik, U.S. Pat. No. 3,807,474 to Wendt, et.al., U.S. Pat. No. 3,843,202 to Lacerte, U.S. Pat. No. 4,095,846 to Agins, and U.S. Pat. No. 4,592,595 to Freeman.

Each of the different wheel designs known in the prior art suffers from certain distinct disadvantages. Forming of the hub and tire of the wheel as a one piece construction, in which the hub and tire material are the same, requires the use of a sufficiently rigid and non-resilient material to maintain the configuration and structural integrity of the hub of the wheel under load. In that situation, rigidity of the hub is obtained at the expense of the ability of the tire of the wheel to absorb and distribute the shock of impacts upon the tire, which is transmitted without attenuation to the hub, the bearings, and the structure supported by the wheel. Inability to absorb shock can result in accelerated tire wear, accelerated bearing wear, and early hub failure.

Wheel designs in the prior art characterized by unitary hubs and separately attached tires, such as the designs illustrated by U.S. Pat. No. 3,695,728 to Haussels and by German Pat. No. 2,651,178, allow the use of a rigid material for the hub of the wheel and more resilient material for the tire, and are more effective in reducing tranmission of impact shock through the wheel structure and to the load supported by the wheel. The resiliency of the tire material used in such designs is limited, however, by the need to prevent disengagement of the tire from the hub. As a result, wheels of this design represent a compromise between shock absorbancy and maintaining the integrity of the wheel, regardless of whether the tire is separately formed and attached to the hub or molded onto the hub without significant interlock. Those of the prior art wheel designs which utilize a hub formed in sections which are interconnected prior to attachment of the tire suffer the additional disadvantage of hub separation due to failure of the adhesive or other means of interconnection of the hub sections.

In an effort to overcome the problems associated with retention of the tire upon the hub several designs utilizing some system of interlock between tire and hub have been devised. In some such designs the hub and tire are formed in two separate operations and then interconnected in a third discrete operation, as exemplified by U.S. Pat. No. 2,629,420 to Walklet, U.S. Pat. No. 3,387,894 to Louik, and U.S. Pat. No. 4,153,303 to Tanner. While wheels produced in accordance with these designs do provide for somewhat more secure tire retention, the tire remains susceptible to separation from the hub upon impact or the imposition of lateral force, especially if a tire material sufficiently resilient to provide significant shock absorbing characteristics to the wheel is employed. In other interlock designs, lateral passageways through the hub are formed, and tire material is forced through such passageways during a process of molding the tire onto the hub. Examples of this approach are found in U.S. Pat. No. 3,807,474 to Wendt, et.al., U.S. Pat. No. 3,843,202 to Lacerte, U.S. Pat. No. 4,095,846 to Agins, and U.S. Pat. No. 4,592,595 to Freeman. In each instance, these designs utilize a one piece, rigid hub upon which the tire is formed in a molding process. Wheels produced in accordance with this general design approach have displayed a significant improvement in tire retention as compared to wheels without such interlock features. The use of one piece, rigid hubs has not, however, fully addressed the disadvantages associated with impact shock and transmittal of impact shock through the wheel structure to the wheel bearings and to the structure supported by the wheel.

Thus there continues to be a need in the industry for a wheel which offers the advantages of a high degree of shock absorbancy, strength, physical integrity, and light weight without the disadvantages associated with wheel designs known in the prior art.

SUMMARY OF THE INVENTION

The wheel of the present invention generally comprises a two piece hub, preferably of molded construction, a unitary tire molded on the hub of the wheel in a separate operation, and axle shaft bearings which are pressed into the hub of the wheel in a further separate operation. The hub of the finished wheel comprises two identical halves, divided along a plane of separation perpendicular to the axis of the axle upon which the finished wheel will rotate. Each hub section includes an inner face, which is mated with the inner face of a second hub section during assembly of the wheel, and an outer face which forms part of the outer surface of the finished wheel.

Each hub section is penetrated by a central aperture having an axis perpendicular to the plane of the inner face of the hub section, which will receive an axle bearing during assembly of the wheel. The central aperture is surrounded by an inner annular ledge on the inner face of the hub section, disposed concentric with the central aperture. The inner face of each hub section also includes an outer annular ledge disposed at the outer edge of the hub section concentric with the central aperture and inner annular ledge, and an annular cavity lying between the inner ledge and the outer ledge. The inner annular ledge includes a plurality of apertures extending from the inner face of the hub section toward the interior thereof, alternating with a plurality of studs extending outwardly from the inner face of the hub section. The outer annular ledge also includes a plurality of closely spaced apertures symmetrically disposed around the outer ledge and extending completely through the hub section from its inner face to its outer face. The outer annular ledge further includes a plurality of studs extending outwardly from the inner face of the hub section, symmetrically spaced around the outer annular ledge. The axes of such apertures and studs provided in both annular ledges are mutually parallel and perpendicular to the plane of the inner face of the hub section.

The outer edge of each hub section includes a plurality of continuous undercut notches extending continuously around such outer edge between the inner face the the outer face of the hub section. One of such continuous notches is disposed at the intersection between the inner face and the outer edge of the hub section and forms one side of an undercut groove which is created upon mating of two hub sections during assembly of the wheel of the invention.

The outer face of each hub section includes a continuous groove extending from such outer face toward the inner face of the hub section, and disposed toward the center of the hub section from the intersection of its outer face and its outer edge. From such continuous groove the outer face of the hub section curves toward the inner face of the hub section, forming a depression in the outer face of the hub section, and then curves outwardly to form a raised bearing support ledge and to strengthen the hub section immediately surrounding the central aperture of the hub. The cavity included in the inner face of each hub section and the depression formed in the outer face of each hub section define a curved web of hub material lying between and supporting the inner and outer ledges of each hub section. The notches and grooves provided in the outer edge and in the outer face of the hub section serve to anchor and support the tire of the wheel which will be molded around mated hub sections.

During assembly of the wheel of the invention, two hub sections are mated, with each of the studs extending from the inner annular ledge of the inner face of each hub section inserted into one of the apertures of that inner ledge, and with each of the studs extending from the outer annular ledge of the inner face of each hub section inserted into one of the apertures of that outer ledge, positively indexing the alignment of the two mating hub sections and forming a partial interlock between the two sections. In addition to contributing to the final interlock formed between the two hub sections during construction of the wheel, the mating of such studs and apertures serves to maintain the alignment and interconnection of the two hub sections during the balance of the wheel assembly process.

As the two hub sections are aligned and mated, each of the apertures penetrating the outer annular ledge of each section which does not receive a stud is brought into coaxial alignment with a matching aperture of the other hub section, forming an open passageway through the rim of the assembled hub. The assembled wheel hub is then placed into a mold and the tire is formed around the circumference of the assembled hub. In the molding process, tire material flows through each of the separate passageways formed through the rim of the hub, forming a system of separated but interactive interlocks between tire and hub.

The extension of tire material through the outer rim of the hub to form the interlock system of the wheel of the invention essentially eliminates any possiblity of separation of the tire from the hub, even with imposition of substantial force perpendicular to the plane of the wheel, and prevents separation of the mated hub sections from each other without the use of adhesives or plastic welding operations. Because the risk of separation is essentially eliminated, it is feasible to use more resilient material for both tire and hub sections than has been possible with other wheel designs, which provides a significant improvement in the shock absorbing ability of the wheel. In addition, the extension of tire material through each passageway in the outer rim of the hub creates a separate shock absorbing unit within an interrelated shock absorbing system interconnected through the tire material formed on the outer faces of the mated hub sections. The structure of the wheel of the invention thus allows the shock of impact at a single point on the tire to be distributed more evenly through the tire, reducing both the total shock effect on the hub and the shock imposed on the portion of the hub nearest the point of impact.

In addition to the shock absorbancy afforded by the tire of the wheel and the extension of tire material through the plurality of passageways formed through the rim of the hub, the hub structure of the wheel of the invention provides a complementary shock absorbancy to the assembled wheel. First, the interconnection between mated hub sections is somewhat flexible, being formed primarily of the resilient tire material, and allows the two hub sections of the assembled wheel a limited freedom of movement relative to each other. That freedom of movement, which is limited by the partial interlock formed by the mating of studs and apertures during assembly of the wheel, is not sufficient to disturb the integrity of the wheel but is effective in relieving stress imposed by impact or laterally applied force. Further, the curvature of the webs of hub material lying between the inner and outer ledges of the hub of the wheel allows flexing of the hub of the wheel in response to impact, absorbing a portion of the impact force and reducing the shock transmitted to the wheel bearings and through the wheel bearings to the structure supported by the wheel.

In the final step of assembly of the wheel of the invention, a conventional axle bearing a pressed into the central aperture of each mated hub section from its outer face, to provide a symetrical bearing assembly to receive an axle shaft.

These and other features of the wheel of the invention will be described in detail with reference to the accompanying drawing figures.

DETAILED DESCRIPTION OF THE INVENTION

Figure 3:
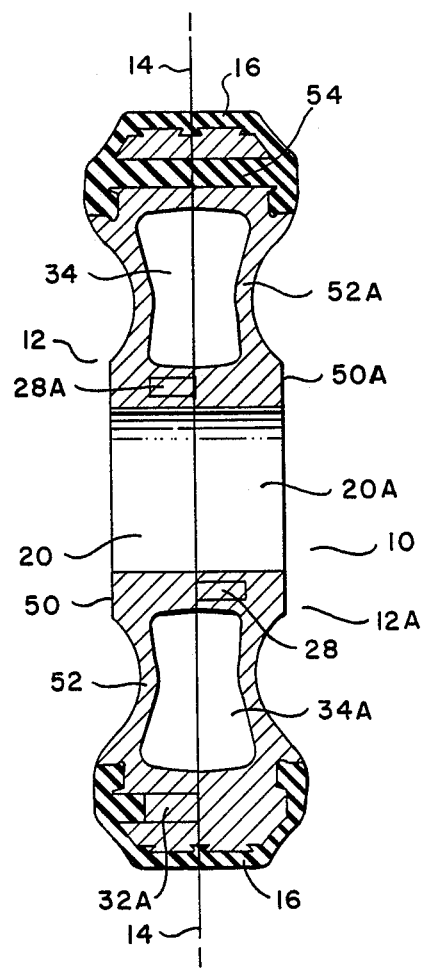
FIG. 3 is a cross-sectioned elevation view of the preferred embodiment of the assembled hub and tire of the wheel of the invention.

Referring now to the accompanying drawing figures, with specific reference first to FIG. 3, the wheel of the invention, designated by reference numeral 10, comprises the major components of two identical hub sections 12 and 12A, divided along a plane of separation 14, a unitary tire 16, and two conventional wheel bearings (not shown) provided during assembly of the wheel but not constituting a part of the invention. Since hub sections 12 and 12A of the completed wheel illustrated in FIG. 3 are identical, it will be understood that reference to features and components of one will also refer to identical features and components of the other.

Figure 1:
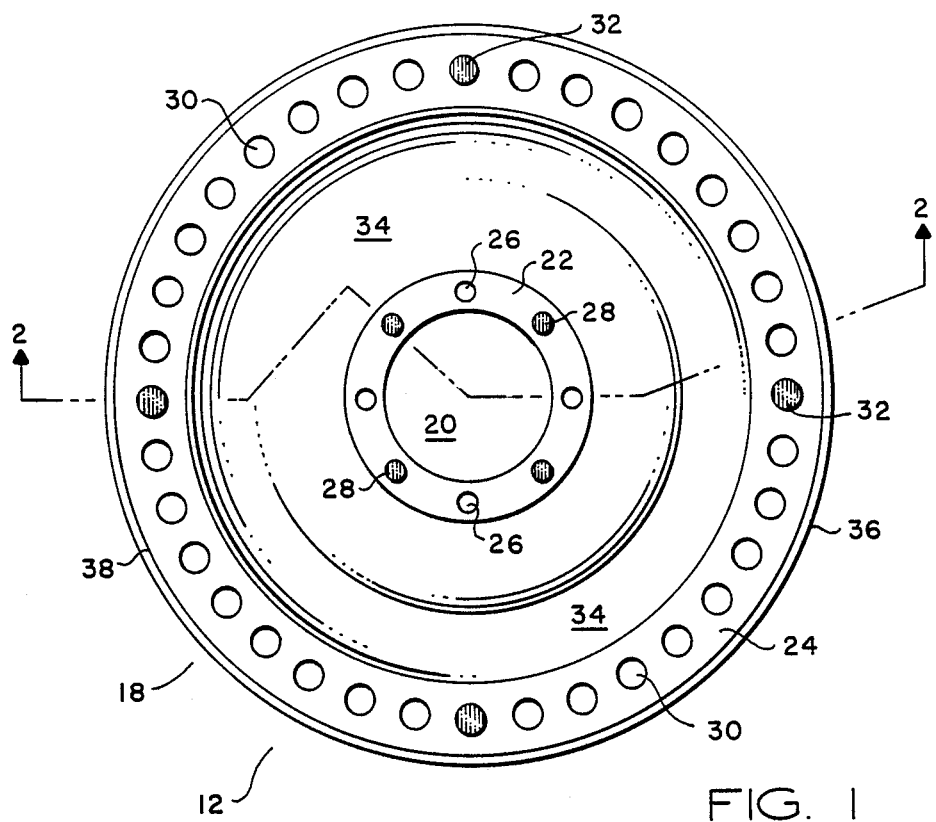
FIG. 1 is an elevation view of the inner face of the preferred embodiment of a hub section of the wheel of the invention.
Figure 2:
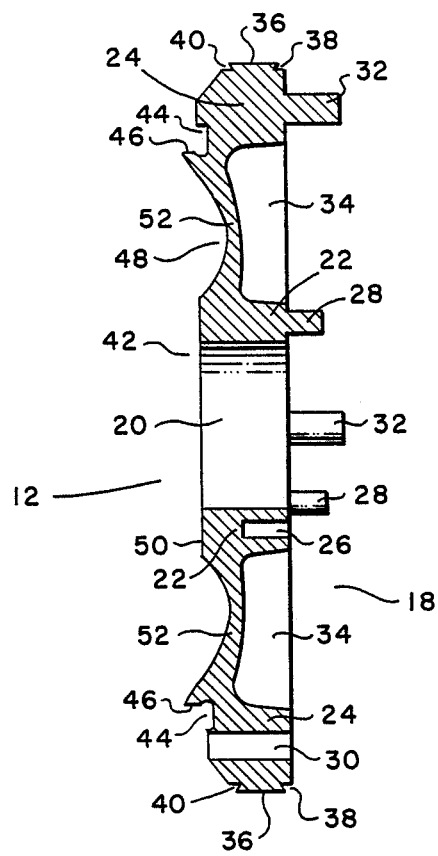
FIG. 2 is a cross-sectioned elevation view of the preferred embodiment of a hub section of the wheel of the invention, along line 2—2 of FIG. 1.

With reference now to FIG. 1, which depicts the inner face 18 of hub section 12 normal to the plane of separation 14, and to FIG. 2, hub section 12 will be seen to include a central bearing aperture fully penetrating hub section 12 with its longitudinal axis perpendicular to plane of separation 14. Inner face 18 of hub section 12 further includes inner annular ledge 22 surrounding aperture 20 and concentric therewith, and outer annular ledge 24 at the periphery of hub section 12 and mutually concentric with aperture 20 and inner annular ledge 22. Inner annular ledge 22 includes a plurality of apertures 26 symmetrically disposed around inner annular ledge 22 and extending into the interior thereof from inner face 18, alternating with a plurality of studs 28 symmetrically disposed around inner annular ledge 22 and extending outwardly therefrom. In the preferred embodiment of wheel 10 depicted, the number of apertures 26 and the number of studs 28 is four.

Outer annular ledge 24 similarly includes a plurality of apertures 30 symmetrically disposed around outer annular ledge 24 and fully penetrating outer annular ledge 24 from inner face 18 to the outer face of hub section 12. Outer annular ledge 24 also includes a plurality of studs 32 symmetrically disposed around outer annular ledge 24 and extending outwardly from inner face 18 of hub section 12. The longitudinal axes of apertures 26, studs 28, apertures 30, and studs 32 are mutually parallel and perpendicular to plane separation 14. In the preferred embodiment of hub section 12 as depicted, the number of apertures 30 is thirty-two, so as to provide a centerline to centerline spacing of approximately twice the diameter of each such aperture, and the number of studs 32 is four. Hub section 12 may be provided in various sizes, and the number of apertures 30 may be varied to provide similarly close aperture spacing.

Inner annular ledge 22 and outer annular ledge 24 define open annular cavity 34 therebetween. In the preferred embodiment of hub section 12, cavity 34 is formed with a convexly curved bottom, as illustrated in FIG. 2.

Hub section 12 further includes continuous outer edge 36 perpendicular to the plane of separation 14. Outer edge 36 includes continuous undercut notch 38 at the intersection of outer edge 36 with inner face 18 of hub section 12, and further includes continuous undercut notch 40 at the intersection of outer edge 36 and outer face 42 of hub section 12.

Outer face 42 of hub section 12 includes continuous groove 44 disposed concentric with central bearing aperture 20, and extending into the interior of hub section 12. Groove 44 is preferably undercut, with a wider base than opening at the surface of outer face 42, to the extent consistent with proper release of hub section 12 from a mold, in order to provide a keyway type interlock to receive tire material therein. Immediately adjacent to the edge of groove 44 nearest the center of hub section 12, outer face 42 includes tire support ledge 46, extending continuously around outer face 42. From tire support ledge 46, outer face 42 curves toward the interior of hub section 12 to form annular depression 48, and outer face 42 curves outwardly to form bearing support ledge 50 and to strengthen hub section 12 immediately surrounding central bearing aperture 20. Depression 48 and cavity 34 are generally aligned on the opposite faces of hub section 12, and define web 52 of hub material therebetween. As depicted in FIG. 2 web 52 is curve in cross-section between inner annular ledge 22 and outer annular ledge 24.

Hub sections 12 are preferably of molded construction, from a slightly resilient yet shape retentive material such as polyethylene or polypropylene. In addition to defining web 52, providing some flexibility to the construction of hub section 12, cavity 34 and depression 48 conserve material of construction for weight reduction and cost economy. In the event that additional strength of web 52 is required for a particular wheel application, cavity 34 and depression 48 may be reduced, with corresponding increase in the thickness of web 52, or alternative materials of construction of hub section 12 may be utilized, such as polycarbonate or metal, or hub section 12 may be reinforced by the addition of agents such as graphite fibers during the manufacturing process.

In assembly of the wheel 10 of the invention, hub sections 12 and 12A are aligned and mated by bringing inner faces 18 and 18A toward each other, inserting each of studs 28 into an aperture 26A and each of studs 28A into an aperture 26, and inserting each of studs 32 into an aperture 30A and each of studs 32A into an aperture 30, and pressing hub sections 12 and 12A together until inner faces 18 and 18A are in firm contact, as depicted in FIG. 3. In the course of joining hub sections 12 and 12A, undercut notches 38 and 38A are brought together to form an undercut groove in outer edge 36/36A of the assembled hub, which will receive tire material during the molding of tire 16. The forming of a continuous undercut groove, as produced by the joining of notches 38 and 38A, in a molded one piece hub would not be feasible, due to the effective impossibility of ejection from the mold.

Upon the joining of hub sections 12 and 12A a partial interlock is formed by the insertion of studs 28/28A into apertures 26/26A and of studs 32/32A into apertures 30/30A. Such partial interlock retains hub sections 12 and 12A in proper alignment during the completion of assembly operations, and also contributes to the final interconnection between components of the finished wheel 10. More specifically, the stud to aperture interconnection limits the movement of hub sections 12 and 12A relative to each other, both laterally and rotationally, without completely eliminating such relative movement. Thus hub sections 12 and 12A are allowed to move sufficiently for stress relief but not sufficiently to disturb the integrity of wheel 10 or impose strain on the tire material interlock which is formed during the manufacture of wheel 10.

The joined hub sections 12 and 12A are placed in a suitable mold and flowable tire material is forced into the mold to form tire 16 onto the hub. During the molding process tire material flows into the undercut groove formed by notches 38 and 38A, into notches 40 and 40A, into continuous grooves 44 and 44A, and also flows fully through the plurality of passageways formed by aligned apertures 30 and 30A to create a plurality of closely spaced interlocks 54. In the cases of apertures 30 and 30A which have received a stud 32A or 32, respectively, tire material flows into any portion of those apertures not filled by the insertion of studs therein. The partially completed wheel is allowed to remain in the mold a sufficient time for the tire material to stabilize, and is then removed from the mold for completion of the assembly operation.

In the preferred embodiment of the invention, the material of construction of tire 16 is urethane with a durometer hardness in the range of 70-90A, but any convenient elastomeric material with suitable properties for the intended use of the wheel may be used. The material of construction should preferably be sufficiently resilient to function as an effective shock absorber, but also sufficiently shape retentive to prevent excessive elongation of the interlocks 54 formed through apertures 30/30A in the hub sections 12/12A.

As a result of the disclosed construction, wheel 10 is a fully integrated unit which cannot be separated into its component parts without destruction. The sytsem of interlocks 54 prevents both removal of tire 26 and separation of hub sections 12 and 12A, while the extension of tire material into the undercut groove formed by notches 38 and 38A, notches 40 and 40A, and continuous grooves 44 and 44A retains the inner surface of tire 16 in firm contact with the associated outer surfaces of hub sections 12 and 12a without the necessity of adhesive bonding. Ledges 46 and 46A, in addition to providing a mold index point, support the extension of tire 16 around outer faces 42 and 42A of hub sections 12 and 12A.

The resilient interconnections between hub sections 12 and 12A, and between the assembled hub and tire 16, provide a positively interlocked wheel 10 without totally eliminating the freedom of movement of the components of wheel 10 relative to each other. As a result, the wheel of the invention is highly effective in absorbing impact shocks and in withstanding laterally imposed forces without failure of the wheel. Each interlock 54 functions as a separate unit to absorb impact shock transmitted from tire 16 to the hub of the wheel, and the interconnection of interlocks 54 through continuous tire 16 functions to distribute impact shock more evenly through the full structure of wheel 10. In addition, curved webs 52 and 52A of the preferred embodiment of wheel 10 are sufficiently flexible to absorb impact shock transmitted through the wheel structure toward the central bearings. Still further, the resilient interconnection between hub sections 12 and 12A allows those hub sections to adjust to slight deformations of wheel 10 resulting from impact and in response to laterally imposed forces with a degree of flexibility beyond that afforded solely by the material of construction of hub sections 12 and 12A. The degree of flexibility provided by the wheel of the invention is also useful in applications in which the wheel is subjected to rapid temperature changes, since the flexible structure can more readily absorb uneven thermal expansion and contraction effects.

In the final step of assembly, conventional wheel bearings are pressed into apertures 20 and 20A, and wheel 10 is ready for use.

The foregoing detailed description of the preferred embodiment of the wheel of the invention is illustrative and not for purposes of limitation. It will be readily understood that the wheel of the invention is adaptable to various modifications and alternative embodiments in structure, and to various materials of construction of its component parts without departing from the scope and spirit of the invention as claimed.

What is claimed is

1. A shock absorbing wheel comprising:

a pair of identical disk-like hub sections, each having an inner face and an outer face and an outer edge, mated at their inner faces along a plane of separation;

each of said hub sections being penetrated by a central bearing aperture having a longitudinal axis perpendicular to said plane of separation, to receive a conventional wheel bearing therein;

each said inner face of said hub sections including an inner annular ledge immediately surrounding and concentric with said central bearing aperture, first alignment means disposed in said inner annular ledge for aligning said hub sections during assembly of the wheel, an outer annular ledge disposed at the periphery of said hub section concentric with said inner annular ledge, a plurality of apertures symmetrically disposed around said outer annular ledge and fully penetrating said outer annular ledge from said inner face of said hub section to the outer face of said hub section with the longitudinal axes of said apertures parallel to the longitudinal axis of said central bearing aperture, second alignment means disposed in said outer annular ledge for aligning said hub sections during assembly of the wheel, an annular cavity lying between said inner annular ledge and said outer annular ledge, open at said inner face and extending into the interior of said hub section from said inner face;

each said outer edge of said hub sections including a plurality of grooves extending circumferentially around said outer edge and extending from said outer edge into the interior of said hub section;

each said outer face of said hub sections including an annular bearing support ledge immediately surrounding said central bearing aperture and disposed concentric therewith opposite said inner annular ledge of said inner face of said hub section, an outer annular ledge at the periphery of said hub section concentric with said annular bearing support ledge opposite said outer annular ledge of said inner face, an annular groove disposed in and concentric with said outer annular ledge of said outer face and extending into the interior of said hub section, and an annular depression lying between said annular bearing support ledge and said outer annular ledge of said outer face, open at said outer face and extending into the interior of said hub section from said outer face; and a tire molded around the periphery of said mated hub sections, having tire material extending into said grooves disposed in said outer edge of each said hub section, extending into said groove disposed in said outer annular ledge of said outer face of each said hub section, and extending through each of said apertures penetrating said hub section through said outer annular ledge to form a system of shock absorbing interlocks flexibly interconnecting said hub sections to each other and said tire to said hub sections.

2. The shock absorbing wheel of claim 1, wherein said first alignment means comprises a plurality of alignment apertures symmetrically disposed around said inner annular ledge of said inner face and extending into said inner annular ledge from said inner face with the longitudinal axes of said alignment apertures parallel to the longitudinal axis of said central bearing aperture, and a plurality of studs each to be received in one of said alignment apertures, symmetrically disposed around said inner annular ledge in alternating relationship with said alignment apertures and extending outward from said inner annular ledge with the longitudinal axes of said studs parallel to the longitudinal axes of said alignment apertures.

3. The shock absorbing wheel of claim 1, wherein said second alignment means comprises a plurality of studs symmetrically disposed around said outer annular ledge of said inner face of each said hub section, interspersed among said apertures in said outer annular ledge, each said stud to be received in one of said apertures in said outer annular ledge, with the longitudinal axes of said studs parallel to the longitudinal axis of said central bearing aperture.

4. The shock absorbing wheel of claim 1, wherein said annular cavity in said inner face of each said hub section has a convexly curved bottom, said annular depression in said outer face of each said hub section has a concavely curved bottom, and said cavity and said depression define a curved web of hub section material therebetween.

5. The shock absorbing wheel of claim 1, wherein each of said hub sections is molded as a one piece construction and the material of construction of each of said hub sections is polyethylene.

6. The shock absorbing wheel of claim 1, wherein said the material of construction of said tire is urethane.

7. A shock absorbing wheel comprising:
 a pair of identical disk-like hub sections mated along a plane of separation, each having a central aperture extending through said hub section with the axis of said central aperture perpendicular to said plane of separation, an inner annular ledge concentrically disposed around said central aperture immediately adjacent thereto, an outer annular ledge concentric with said central aperture and said inner annular ledge and disposed at the periphery of said hub section, and an annular web interconnected between said inner annular ledge and said outer annular ledge;
 a plurality of apertures radially disposed around said outer annular ledge and extending therethrough, each of said apertures extending through said outer annular ledge having a longitudinal axis perpendicular to said plane of separation;
 alignment means for aligning said hub sections in mating relation during assembly of the shock absorbing wheel and for aligning each of said apertures in each of said hub sections coaxially with one of said apertures in the other of said hub sections;
 a unitary tire disposed symmetrically about the outer periphery of said hub sections mated in paired relation and extending around said outer annular ledges of said hub sections so as to overlie said apertures extending therethrough, said unitary tire forming a positive interlock between said hub sections and between said unitary tire and said hub sections by means of a plurality of strands of tire material, each extending from one side of said unitary tire to the other side of said unitary tire through each coaxially aligned pair of said apertures extending through said outer annular ledges of said hub sections; and
 an axle bearing assembly extending through said central aperture of each of said hub sections.

8. The shock absorbing wheel of claim 7, wherein said web interconnected between said inner annular ledge and said outer annular ledge of each of said hub sections defines a curve in an imaginary plane bisecting said hub section and including the axis of said central aperture of said hub section, and the thickness of said web measured perpendicular to said plane of separation between said hub sections is less than the thickness of either of said inner annular ledge or of said outer annular ledge.

9. The shock absorbing wheel of claim 8, wherein upon mating of a pair of said hub sections along said plane of separation the inner annular ledge of each of said hub sections is brought into contact with the inner annular ledge of the other of said hub sections, the outer annular ledge of each of said hub sections is brought into contact with the outer annular ledge of the other of said hub sections, and the curvature of said web of each of said hub sections is such that an annular cavity is formed between said webs.

10. The shock absorbing wheel of claim 7, wherein said alignment means of each said hub section comprises a plurality of projections extending outwardly from said inner annular ledge perpendicular to and across said plane of separation and radially disposed symetrically around said inner annular ledge, and a plurality of alignment apertures, equal in number to the number of said projections, radially disposed symetrically around said inner annular ledge in alternating relation with said projections and extending into the interior of said inner annular ledge, with said projections and said alignment apertures configured such that the projections of one hub section are received in closely fitting relation within the alignment apertures of a second hub section when said hub sections are brought into mating relationship along said plane of separation.

11. The shock absorbing wheel of claim 10, wherein said alignment means of each said hub section further comprises a plurality of outer projections radially disposed symetrically around said outer annular ledge and extending outwardly therefrom across and perpendicularly to said plane of separation, said outer projections being interspersed among said apertures extending through said outer annular ledge, with each of said outer projections configured to be received in one of said apertures extending through said outer annular ledge upon mating of two said hub sections along said plane of separation.

12. The shock absorbing wheel of claim 7, wherein each of said hub sections is formed as a one piece construction of a stiff resilient plastic material.

13. The shock absorbing wheel of claim 7, wherein each of said hub sections is molded as a one piece construction of a stiff resilient plastic material reinforced by the addition of reinforcing fibers to the material of construction during the forming of said hub sections.

14. The shock absorbing wheel of claim 7, wherein said unitary tire is formed of a resilient elastomer material.

15. The shock absorbing wheel of claim 7, wherein said outer annular ledge of each of said hub sections further includes one or more grooves disposed in the portion of said outer annular ledge under said unitary tire, each of said grooves extending from the surface of said outer annular ledge into the interior thereof to receive tire material therein and provide additional interlock between said unitary tire and said hub sections.

16. A shock absorbing wheel comprising:
a pair of identical disk-like hub sections each having a central aperture extending through said hub section with the axis of said central aperture perpendicular to the plane of said hub section, said central aperture to receive a wheel bearing assembly and axle therethrough about which the shock absorbing wheel will rotate, and a plurality of interlock apertures symetrically disposed around the periphery of said hub section and extending threrethrough with the longitudinal axis of each such interlock aperture perpendicular to the plane of said hub section, said hub sections mated with said central apertures in coaxial alignment and with each of said interlock apertures of each hub section in coaxial alignment with one of said interlock apertures of the other hub section; and
a unitary tire of resilient material formed symetrically around the periphery of the mated pair of said hub sections such that said tire extends from the outer edge of said hub sections toward the center thereof a sufficient distance to overlie said interlock apertures and such that a strand of tire material extends through each coaxially aligned pair of said interlock apertures to resiliently interconnect said tire to said hub sections and to simultaneously resiliently interconnect each of said hub sections to the other.

17. The shock absorbing wheel of claim 16, wherein each of said identical disk-like hub sections further comprises a first annular ring immediately surrounding said central aperture and having a flat face on the side of said hub section to be brought into mating contact with the other of the pair of said hub sections, a second annular ring disposed at the periphery of said hub section concentric with said first annular ring, such that said second annular ring is penetrated by said interlock apertures, and having a flat face on the side of said hub section to be brought into mating contact with the other of the pair of said hub sections, and an annular web of lesser thickness than either said first annular ring or said second annular ring interconnected between said first annular ring and said second annular ring, with said flat face of said first annular ring and said flat face of said second annular ring lying in a single plane which is perpendicular to the axis of said central aperture.

* * * * *